United States Patent
Andersson et al.

[11] Patent Number: 6,030,005
[45] Date of Patent: Feb. 29, 2000

[54] METHOD AND DEVICE FOR COUPLING PIPES

[75] Inventors: Pontus Andersson, Ängelholm, Sweden; Werner Andresen, Haderslev, Denmark

[73] Assignee: Lindab AB, Bastad, Sweden

[21] Appl. No.: 08/993,199

[22] Filed: Dec. 18, 1997

[30] Foreign Application Priority Data

Dec. 20, 1996 [SE] Sweden .................................. 9604749

[51] Int. Cl.$^7$ .................................................. F16L 23/00
[52] U.S. Cl. ........................ 285/367; 285/233; 285/236
[58] Field of Search .................................. 285/233, 236, 285/367

[56] References Cited

U.S. PATENT DOCUMENTS

| | | |
|---|---|---|
| 2,426,423 | 8/1947 | Woolsey . |
| 2,699,343 | 1/1955 | Troeger et al. . |
| 2,941,823 | 6/1960 | Good . |
| 3,006,663 | 10/1961 | Bowne . |
| 3,084,959 | 4/1963 | Stanton .................................. 285/233 |
| 3,235,293 | 2/1966 | Condon . |
| 3,334,928 | 8/1967 | Schmunk .............................. 285/233 |
| 3,479,006 | 11/1969 | Gittleman ............................ 285/233 |
| 3,633,947 | 1/1972 | Nelson ................................. 285/233 |
| 3,788,677 | 1/1974 | Stade et al. . |
| 4,135,741 | 1/1979 | Albertsen ............................. 285/55 |
| 4,215,883 | 8/1980 | Brown .................................. 285/236 |
| 4,822,083 | 4/1989 | Meinig . |
| 5,137,305 | 8/1992 | Straub . |

FOREIGN PATENT DOCUMENTS

| | | |
|---|---|---|
| 05081989 | 6/1992 | Denmark . |
| 057373 | 8/1982 | European Pat. Off. ........... 285/236 |
| 287755A1 | 10/1988 | European Pat. Off. . |
| 8326971A | 12/1996 | Japan . |
| 466415 | 2/1992 | Sweden . |
| 549183 | 11/1942 | United Kingdom .............. 285/233 |
| WO967848 | 3/1996 | WIPO . |
| WO9722828 | 6/1997 | WIPO . |

OTHER PUBLICATIONS

"Ventilation 96", Lindab, from 1996, p. 6/42.

"Platslageri" (in English: Plate Works), No. 11/96, advertisement.

R3., Pioneer in METU duct Manufacture System, Circular Duct FLanges LF & SR.

"Circular Duct System—Quick Assembly and Dismantling", Lindab Transfer.

*Primary Examiner*—Anthony Knight
*Assistant Examiner*—Alison K. Pickard
*Attorney, Agent, or Firm*—Weingarten, Schurgin, Gagnebin & Hayes LLP

[57] ABSTRACT

In a method of coupling a first pipe with a second pipe having a circumferential bead, use is made of an annular clamping band which is applied on the outside of the end beads and is tightened around the end beads when the pipes are placed end to end. The clamping band has on its inside a sealing ring, which is arranged against the end beads. A first recess of the sealing ring is formed on and held on the outside of the end bead of the first pipe in such a manner that a second recess of the sealing ring is arranged axially outside this end bead. The second recess of the sealing ring is then formed on the end bead of the second pipe, and finally the clamping band is tightened around the end beads with the sealing ring placed between the clamping band and the end beads.

11 Claims, 3 Drawing Sheets

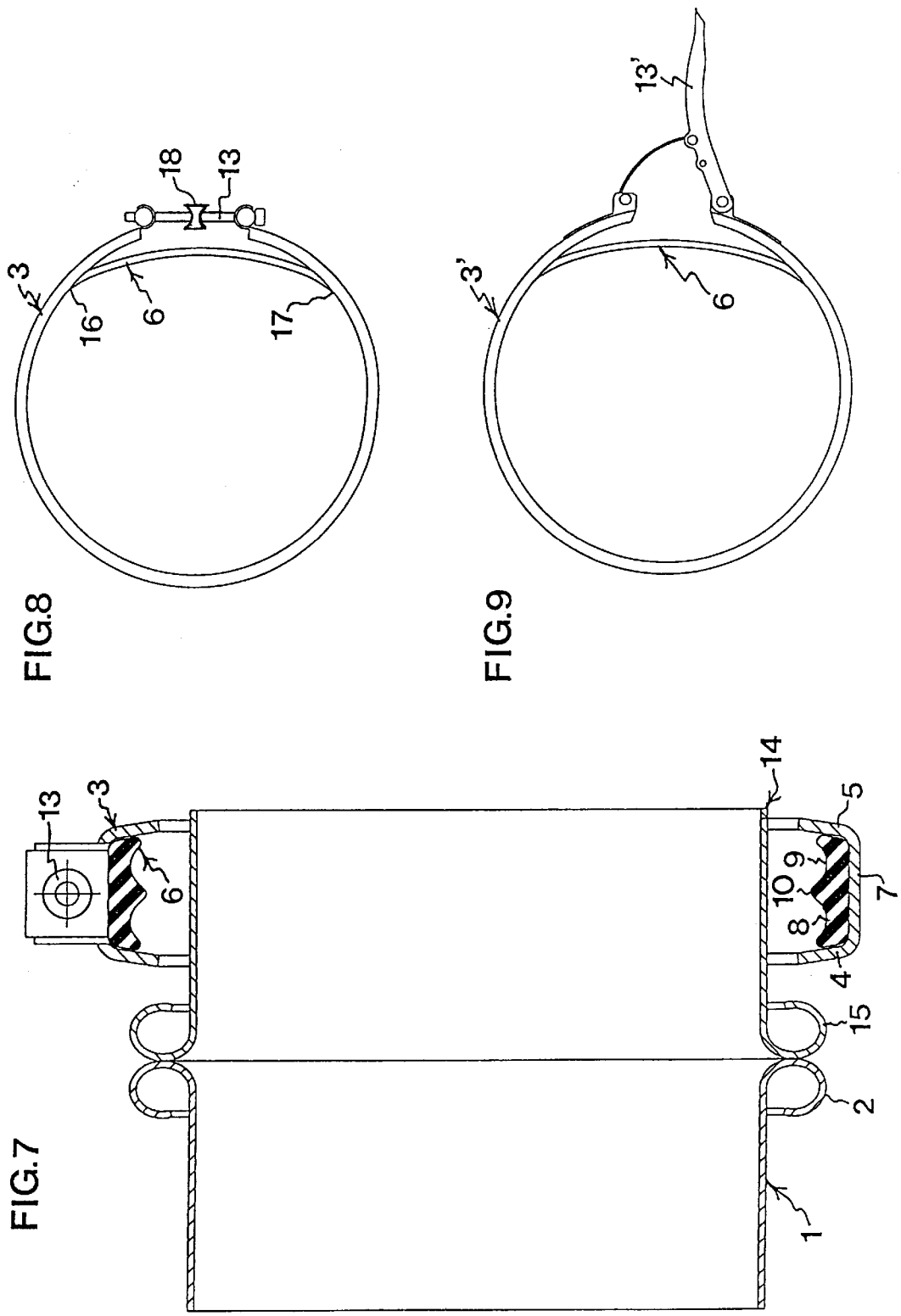

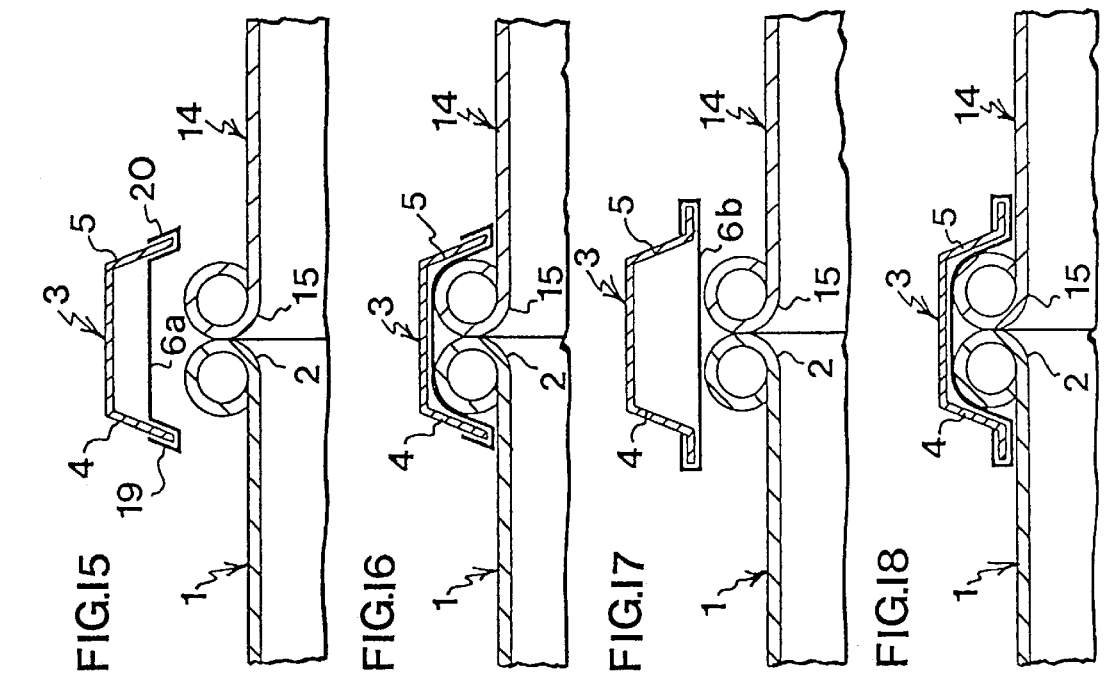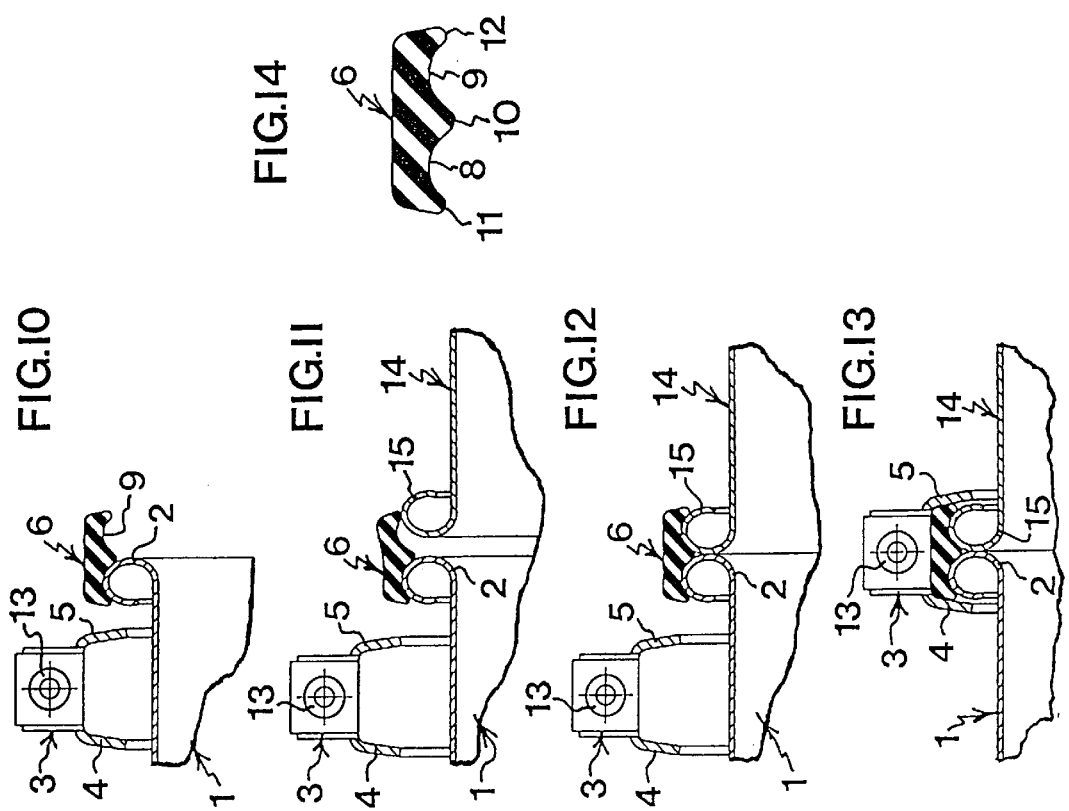

METHOD AND DEVICE FOR COUPLING PIPES

FIELD OF THE INVENTION

The present invention relates to a method and a device for coupling two pipes, which at their end have an outwardly directed circumferential bead, use being made of an annular clamping band which is tightened around the end beads which are arranged end to end, thereby establishing a seal between the clamping band and the end beads.

BACKGROUND ART

There are various prior-art methods for coupling pipes which at their end have a circumferential bead. The applicant's PCT Publication WO 96/07848 discloses how a so-called clamping band is tightened around circumferential end beads of two pipes which are arranged end to end. This known clamping band is annular and its cross-section is in the shape of a U, the flanges of which are directed towards the pipes and are arranged on each side of the end beads and the web of which is placed radially outside the end beads. In the coupling operation, the clamping band is tightened around the end beads by means of a clamping mechanism, and in a preferred embodiment there is a seal between the inside of the clamping band and the outside of the end beads.

Practical designs of the above-described clamping band, which are available on the market, are shown in the applicant's catalogue "Ventilation 96" from 1996, p. 6/42, and in an advertisement placed in the magazine "Plåtslageri" (in English: Plate Works), No. 11/96.

These prior-art clamping bands function in a satisfactory manner in terms of construction, but certain drawbacks arise during mounting. The fitter must in fact hold the end beads of the two pipes joined at the same time as the clamping band is applied and tightened. Since piping systems, e.g. ventilation ducts, where the clamping band is used are often placed in a position high above the floor, the fitter usually stands on a ladder and handles the clamping band in the original mounting of the pipes or in later dismounting thereof for cleaning purposes. Holding the two pipes with one hand and tightening the clamping band with the other hand is a complicated operation for the fitter, especially if the fitter is placed in an uncomfortable working position. In a worst case, for instance in connection with large pipe dimensions, two fitters may be required to couple together pipes by means of clamping bands of the above-mentioned type.

A further drawback of these prior-art clamping bands is that sometimes sealing problems arise in the joint between the two clamping band ends where the clamping mechanism is arranged. This problem is stressed especially by the fact that the seal placed on the inside of the clamping band usually is slotted and has Its opposite ends in the area of the joint between the opposite ends of the clamping band.

There is thus a need of a more rational method and an improved device for coupling together pipes of the above-mentioned type, while at the same time a perfect sealing function is ensured.

As a further example of prior-art technique, mention can be made of the device according to EP-A-287,755 (counterpart; U.S. Pat. No. 4,882,083) for coupling together two pipes having end flanges. This device comprises a clamping band which is applied around the end flanges of the pipes placed end to end, but the fitter using this clamping band experiences the same difficulties as discussed above.

The clamping band according to the European publication thus offers no solution to the inconveniences described above.

SUMMARY OF THE INVENTION

An object of the present invention therefore is to provide a method for coupling together pipes having end beads, which is improved compared with prior art. A further object of the invention is to provide an improved device for such coupling together.

These and other objects, which will appear from the following description, are now achieved by a method of coupling two pipes, each having an end with an outwardly directed circumferential bead, use being made of a device comprising an annular clamping band, which is applied on the outside of the end beads and is tightened around the same when the pipes are placed end to end, and a circumferential elastic sealing ring, which is made to abut against the end beads and is tightened around the end beads by means of the clamping band, which is arranged on the outside of the sealing ring; wherein a first circumferential portion of the sealing ring is first applied on and is held on the end bead of one (the first) pipe, a second circumferential portion of the sealing ring being arranged axially outside the end bead of the first pipe; the second portion of the sealing ring being applied on the end bead of the second pipe; and the clamping band being tightened around the end beads, the entire sealing ring or the main part thereof being placed between the clamping band and the end beads.

The objects are also achieved by means of a device for carrying out the method, wherein the sealing ring has an inner diameter and an outer diameter and wherein the inner diameter of the sealing ring, in a non-tightened state before being applied on the end beads, is smaller than the outer diameter of the two end beads.

Through the invention many advantages are achieved, especially by the fact that in the coupling operation, the sealing ring is first used to fix the clamping band to a free end bead or to keep two end beads arranged end to end together. As a result, the mounting of the clamping band is simplified to a considerable extent and the drawbacks which the fitters have experienced until now are obviated. Thanks to the fact that, contrary to the technique that has been prevalent so far, the sealing ring is given a closed, endless form, the sealing problems are reduced.

The invention is applicable to many different types of piping systems, for instance ventilation duct systems and duct systems for conveying finely divided materials.

BRIEF DESCRIPTION OF THE DRAWINGS

The invention and its many advantages will be described in more detail below with reference to the accompanying drawings, which for the purpose of illustration show some nonlimiting embodiments and in which FIG. 7 is a vertical section of the corresponding coupling in accordance with a second embodiment of the invention, FIG. 8 is a side view of a clamping band to be used when applying the invention, FIG. 9 is a side view of a similar clamping band with a different clamping mechanism, FIGS. 10–13 are partial vertical sections corresponding to FIGS. 1–6, showing how two pipes are coupled together in accordance with a third embodiment of the invention, FIG. 14 is a cross-sectional view of a sealing ring which is advantageously used in these three embodiments, FIGS. 15–16 are similar vertical sections showing how a differently designed seal is applied on the end beads, and FIGS. 17–18 are corresponding vertical sections of a variant of the embodiment shown in FIGS. 15–16.

DESCRIPTION OF PREFERRED EMBODIMENTS OF THE INVENTION

Figures 1, 4:
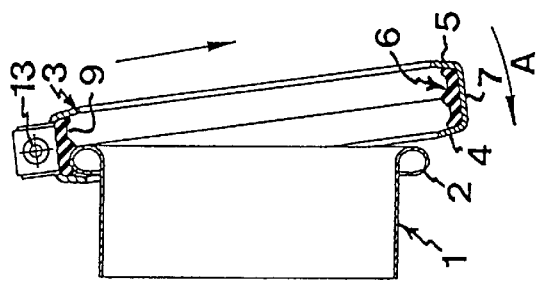

FIGS. 1–6 illustrate a first embodiment of the invention, FIG. 1 showing a cylindrical pipe 1 with an outwardly directed circumferential end bead 2, on which an annular clamping band 3 is applied. The clamping band 3 may be of the type as shown in FIG. 8 or FIG. 9, as will be described in more detail below.

The pipe 1 may consist of, for instance, a fixedly mounted pipe included in a ventilation duct system, in which the invention is applied. The clamping band 3 is substantially U-shaped in cross-section with two radially inwardly directed flanges 4, 5, between which a sealing ring 6 is placed, which is fixed to the inside of the web 7 of the clamping band 3.

The sealing ring 6, which is of the cross-section shown in FIG. 14, is unbrokenly circumferential and elastic and is preferably made of rubber. As is best seen from FIG. 14, the annular sealing ring 6 has two circumferential cup-shaped portions or recesses 8, 9 for abutment against end beads of the pipes where the clamping band 3 is used. Further the sealing ring 6 has a central, circumferential inwardly directed ridge 10 and two similar outer ridges 11, 12 which will be described below.

To tighten the clamping band 3 around the end beads of the pipes, use is made of a clamping mechanism 13, which is of a type known per se and which need not be described in more detail here. An alternative clamping mechanism 13' is shown in FIG. 9.

Figures 3, 6:
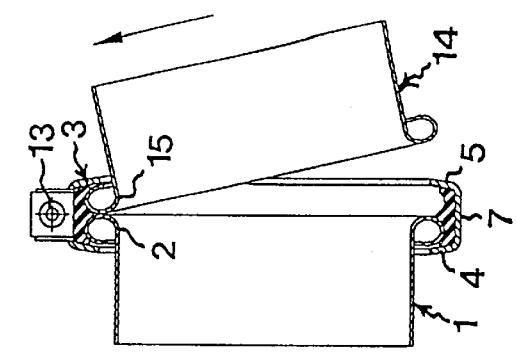
FIGS. 1–6 are vertical sections showing how two pipes provided with end beads are coupled together according to a first embodiment of the invention.

The device shown in FIGS. 1–6 is intended for coupling the first pipe 1 to a second cylindrical pipe 14 provided with an outwardly directed circumferential end bead 15 (see FIG. 3). In this example, the pipe 14 is a loose pipe which the fitter should connect to the fixed pipe 1. After completion of the coupling, the second pipe 14 constitutes an extension of the first pipe 1.

The method according to the first embodiment of the invention is applied as follows.

The clamping band 3 is first placed on a circumferential portion of the end bead 2 of the first pipe 1, one recess 8 of the sealing ring 6 forming a first sealing portion and engaging said circumferential portion (FIG. 1). Subsequently, the clamping band 3 is pivoted in the direction of arrow A to the position shown in FIG. 2, where the recess 8 of the seal 6 completely encompasses and engages the bead 2.

Figures 2, 5:
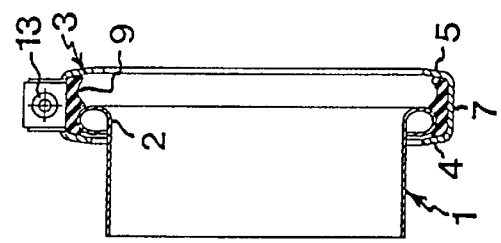

As is evident from FIG. 3, a circumferential portion of the end bead 15 of the second pipe 14 is then placed against the second recess 9, which forms a second sealing portion, of the sealing ring 6, whereupon the second pipe 14 is pivoted in the direction of arrow B (FIG. 4) to the position shown in FIG. 5. Finally, the clamping band 3 is tightened around the two end beads 2, 15 with axially outwardly directed surfaces thereof abutting against one another, by means of the clamping mechanism 13 for coupling together the two pipes 1 and 14 (FIG. 6).

The great advantage of this coupling procedure is that owing to the engagement between the end bead 2 of the first pipe 1 and the first recess 8 (FIG. 2) of the sealing ring 6, the clamping band 3 initially is fixed to the fixed pipe 1, whereupon the fitter can easily insert the loose pipe 14 in the clamping band 3 (with engagement between the bead 15 and the recess 9) and pivot it in place for final tightening.

As shown in FIG. 2, the clamping band 3 is fixed to the bead 2 in such a manner that the second recess 9 of the sealing ring 6 is positioned axially outside the end bead 2 and forms an opening, in which the end bead 15 of the loose pipe 14 can easily be put in place.

When applying the method according to the second embodiment of the invention as shown in FIG. 7, the clamping band 3 is first placed axially a distance up on the loose pipe 14, whereupon the two pipes 1, 14 are arranged end to end such that the end beads 2, 15 are positioned axially opposite to each other. The clamping band 3 is then moved axially in the direction of arrow C to a position radially outside the end beads 2, 15 and is finally tightened around these. Otherwise, this embodiment of the invention functions in the same manner as the above-described first embodiment.

Also the second embodiment confers great advantages since the fitter in a few simple operations can put the clamping band 3 in place. The fitter can simultaneously hold the clamping band 3 and the loose pipe 14 and arrange the beads 2, 15 against each other, whereupon the clamping band 3 can easily be moved in place.

FIG. 8 is a side view of the clamping band 3 and shows that the sealing ring 6 in its non-tightened state has a smaller inner diameter than the clamping band 3. With a view to ensuring satisfactory clamping of the seal 6, it has, in its non-tightened state, also a smaller inner diameter than the outer diameter of the two end beads 2, 15. The seal 6 is fixed to the inside of the clamping band 3 through the angle of an arc which slightly exceeds 270°. The two points 16, 17, in which the seal 6 begins to go clear of the inside of the clamping band 6 can in an alternative embodiment (not shown) be closer to the clamping mechanism 13 such that the outer diameter of the seal 6 in this position approaches the inner diameter of the clamping band 3.

FIG. 8 also shows an extra sealing element 18 which in its clamped state promotes the sealing of the joint between the two end portions of the clamping band 3, which are pulled towards each other in a known manner as the clamping band 3 is tightened.

FIG. 9 shows another clamping band 3', which is of the same fundamental composition as the clamping band 3 in FIG. 8, but has a different clamping mechanism 13'.

The method according to the third embodiment of the invention is shown in FIGS. 10–13, in which the sealing ring 6 and the clamping band 3 constitute separate parts. In this case, first the seal 6 is applied on the first bead 2, whereupon the second bead 15 is made to engage the seal 6 such that this is clamped around and keeps together the two end beads 2, 15 engaging each other (see FIG. 12). The clamping force of the sealing ring 6 around the end beads 2, 15 is in some cases so great that it accomplishes on its own a coupling together of the two pipes 1, 14. Finally the clamping band 3 is applied on the outside of the seal 6 (FIG. 13) and is tightened in the same manner as described above. This third embodiment confers essentially the same advantages as have been indicated above and should be preferred in the cases where the clamping band 3 and the seal 6 need not necessarily constitute a single unit.

For safe clamping of the seal 6 on the end beads 2, 15, especially in the embodiment shown in FIGS. 10–13, the inner diameter of the seal 6 in its non-tightened state is, as mentioned above, smaller than the outer diameter of the beads 2, 15. Thus the seal 6 must be expanded before being applied on the beads 2, 15 (cf. FIGS. 8 and 9).

In the described three embodiments of the invention use is preferably made of a sealing ring 6 having the cross-section as shown in FIG. 14. When the seal 6 is mounted, the central ridge 10 is pressed into the circumferential radially outwardly directed space which is defined by the radially outwardly directed boundary surfaces of the beads 2, 15 arranged end to end. Thus, the ridge 10 promotes a reliable seal of the joint between the ends of the pipes 1, 14 as the clamping band 3 is tightened.

Thanks to the central ridge 10, it is also ensured that the end beads 2, 15 of the pipes 1, 14 come into the correct recess 8, 9 when tightening the seal 6. Moreover, the ridge 10 facilitates the pivoting motions of the clamping band 3 as shown in FIGS. 1 and 4.

The above advantages are also stressed by the two outer ridges 11, 12, which together with the central ridge 10 define the cup-shaped portions 8 and 9. Preferably, the central ridge 10 has a smaller inner diameter than the two outer ridges 11, 12, which makes the arrangement of the beads 2, 15 in the clamping band 3 easier.

FIGS. 15–16 show a clamping band 3 with an alternatively designed seal 6a, which has the form of a band and whose circumferential edge portions 19, 20 are fixed to the free edge portions of the flanges 4, 5. In its non-tightened state, the seal 6a is spaced apart from the inside of the clamping band 3, and when arranging the clamping band 3 against the beads 2, 15, the seal 6a is resilient in the direction of said inside (FIG. 16) The advantage of this embodiment is that a seal is established also against the outside of the pipes 1, 14, i.e. on both sides of the beads 2, 15, by the edge portions 19, 20 of the seal 6a are being arranged against the pipes 1, 14.

FIGS. 17–18 illustrate a further variant which is based on the principle shown in FIGS. 15–16. In this embodiment, the seal 6b is fixed in a different manner to the flanges 4, 5 of the clamping band 3. This variant, where the flanges 4, 5 are bent away from the joint between the beads 2, 15, yields a particularly advantageous holding of the seal 6b.

In the embodiments in FIGS. 15–16 and 17–18, respectively, the main part of the seal 6a, 6b is placed between the clamping band 3 and the end beads 2, 15 arranged against each other when coupling together the pipes 1–14, whereas in the embodiments shown in FIGS. 1–6, FIG. 7 and FIGS. 10–13, the entire seal 6 is placed between the clamping band and the beads.

The seals 6a and 6b certainly have no cup-shaped recesses of the type that has been described above, but nevertheless the sealing band can be divided on the one hand into a first sealing portion to be arranged against the one bead and, on the other hand, a second sealing portion to be arranged against the other bead.

Finally, it should be pointed out that the inventive concept is in no way restricted to the embodiments described above, and modifications are feasible within the scope of the inventive idea that will be expressed in the appended claims. It should be particularly mentioned that the seal can be of a different design as can also the clamping band. The important thing is that the engagement between the and beads and the seal occurs in such a manner that the objects of the invention are achieved.

What is claimed is:

1. A method for coupling a first pipe with a second pipe, said pipes adapted for ventilation duct systems or duct systems for conveying finely divided material, comprising the steps of:

providing a first pipe and a second pipe, each pipe having an end with an outwardly directed circumferential end bead having a radially outwardly directed surface and an axially outwardly directed surface;

providing a sealing ring having a first circumferential portion and a second circumferential portion, at least the first circumferential portion of the sealing ring defining an inner diameter;

abutting the first circumferential portion of the sealing ring against the radially outwardly directed surface of the end bead of the first pipe in which the inner diameter defined by the first circumferential portion of the sealing ring is smaller than the diameter of the outside of the end bead of the first pipe, the second circumferential portion of the sealing ring being arranged axially outside the end bead of the first pipe;

abutting the second circumferential portion of the sealing ring against the radially outwardly directed surface of the end bead of the second pipe;

bringing the first and second pipes together with the axially outwardly directed surfaces of the end beads in an end-to-end abutting relationship, the first pipe and the second pipe held in the end-to-end abutting relationship by said sealing ring; and tightening an annular clamping band around the end beads of both the first and second pipes such that at least a portion of the sealing ring is captured between the clamping band and the end beads of the first and second pipes as the clamping band is tightened.

2. The method of claim 1 wherein the sealing ring is fixedly arranged inside the clamping band and said step of abutting the second circumferential portion of the sealing ring against the end bead of the second pipe includes engaging a circumferential portion of the radially outwardly directed surface of the end bead of the second pipe with the second circumferential sealing portion which projects axially outside of the end bead of the first pipe by pivoting the second pipe about an engaging point between the circumferential portion and the end bead of the second pipe such that the entire end bead of the second pipe is positioned radially inside the second circumferential portion and is in engagement therewith before the clamping band is tightened around the end beads.

3. The method of claim 1 wherein the sealing ring is carried inside the clamping band and including the further step of placing the clamping band on the first pipe such that the clamping band is separated from the end bead of the first pipe, and arranging the first and second pipes against one another, end to end, such that the axially outwardly directed surfaces of the end beads of the first and second pipes are positioned in axial juxtaposition and the clamping band is moved to a position radially outside said end beads whereupon said tightening step occurs.

4. The method of claim 1 wherein the sealing ring and the clamping band are separate parts, and said step of tightening the annular clamping band around the end beads of both the first and second pipes includes applying the sealing ring on the outside of the end beads of the first and second pipes while holding the first and second pipes with the axially outwardly directed surfaces of the end beads in end to end abutting relationship, and tightening the clamping band around the outside of the sealing ring.

5. The method of claim 1 wherein the sealing ring includes a central circumferential radially inwardly directed ridge that is positioned between the first circumferential portion and the second circumferential portion, and including the further step of pressing the central ridge into a circumferential radially outwardly directed space which is defined between the radially outwardly directed surfaces of the end beads when the first and second pipes are placed end to end.

6. The method of claim 5 wherein the sealing ring has first and second circumferential inwardly directed recesses on opposite sides of the central ridge, and including the further step of abutting the first and second circumferential recesses against the radially outwardly directed surfaces of the end beads of the first and second pipes, respectively.

7. The method of claim 1, including the further step of employing a generally U-shaped clamping band having first and second flanges with a web disposed therebetween, the first and second flanges being positioned around the end beads of the first and second pipes, respectively.

8. The method of claim 5 wherein the sealing ring is band-shaped and includes edge portions affixed along the first and second circumferential portions, the central circumferential portion of the sealing band being positioned between the edge portions, and including the further step of positioning the edge portions apart from the inside of the clamping band before tightening the clamping band around the end beads of the first and second pipes.

9. The method of claim 1 including the further step of stretching said sealing ring into sealing relation across the end beads and extending between outside portions of said pipes adjacent said end beads during tightening of said clamping band.

10. The method of claim 1 wherein in the step of providing the first pipe and the second pipe, the first pipe and the second pipe are formed of a metal.

11. The method of claim 1 wherein in the step of providing the sealing ring, the sealing ring is formed of an elastic material.

* * * * *